US011400760B2

(12) United States Patent
Neuber et al.

(10) Patent No.: US 11,400,760 B2
(45) Date of Patent: Aug. 2, 2022

(54) VEHICLE TIRES

(71) Applicant: Continental Reifen Deutschland GmbH, Hannover (DE)

(72) Inventors: Malgorzata Neuber, Wunstorf (DE); Carsten von Zobeltitz, Seelze (DE); Jens Kleffmann, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 185 days.

(21) Appl. No.: 15/509,511

(22) PCT Filed: Jun. 22, 2015

(86) PCT No.: PCT/EP2015/063905
§ 371 (c)(1),
(2) Date: Mar. 8, 2017

(87) PCT Pub. No.: WO2016/041647
PCT Pub. Date: Mar. 24, 2016

(65) Prior Publication Data
US 2017/0282650 A1    Oct. 5, 2017

(30) Foreign Application Priority Data

Sep. 17, 2014  (DE) .................. 10 2014 218 662.5

(51) Int. Cl.
*B60C 11/01* (2006.01)
*B60C 11/04* (2006.01)
*B60C 11/03* (2006.01)

(52) U.S. Cl.
CPC .............. *B60C 11/01* (2013.01); *B60C 11/04* (2013.01); *B60C 2011/013* (2013.01); *B60C 2011/039* (2013.01); *B60C 2200/06* (2013.01)

(58) Field of Classification Search
CPC .......................... B60C 11/01; B60C 2011/013
See application file for complete search history.

(56) References Cited

U.S. PATENT DOCUMENTS

| | | | | |
|---|---|---|---|---|
| 3,976,115 | A * | 8/1976 | Mirtain ..................... | B60C 9/18 152/532 |
| 4,915,150 | A * | 4/1990 | Takusagawa ........... | B60C 11/01 152/209.16 |
| 5,151,139 | A * | 9/1992 | Takada .................... | B60C 11/01 152/454 |
| 5,622,575 | A | 4/1997 | Meyer-Adlung et al. | |

(Continued)

FOREIGN PATENT DOCUMENTS

| | | |
|---|---|---|
| DE | 102009044418 A1 | 5/2011 |
| EP | 2990219 A1 | 3/2016 |

(Continued)

*Primary Examiner* — Timothy Kennedy
*Assistant Examiner* — Olukorede Esan
(74) *Attorney, Agent, or Firm* — Gregory Adams; David L. Cate

(57) ABSTRACT

The invention relates to vehicle tires for utility vehicles, comprising a belt (9) and a tread profile that extends in the axial direction A of the vehicle tire between two tire shoulders, in each of which a profiled shoulder strip (19) is formed that extends over the circumference of the vehicle tire. The profiled shoulder strip is delimited in the axial direction A towards the equatorial plane Ä of the tire by a groove (20), which extends over the circumference of the vehicle tire, and on the profiled strip face facing away from the equatorial plane Ä by a respective surface of the tire lateral wall (2), which forms the profiled shoulder strip (19) flank facing away from the equatorial plane Ä. The tread profile is delimited by a surface which forms the road contact surface on the sectional planes containing the tire axis, said surface forming a surface contour line K which is curved towards the tire between the profiled shoulder strips (19). In at least one profiled shoulder strip (19), the surface which forms the road contact surface is formed as the extension of the curved surface contour line K into the profiled shoulder strip (19) in an axial first extension section (21) of the width a, said extension section adjoining the circumferential groove (20), and the radial position of the surface which forms the road contact surface constantly decreases outwards along the (Continued)

Figure 1:
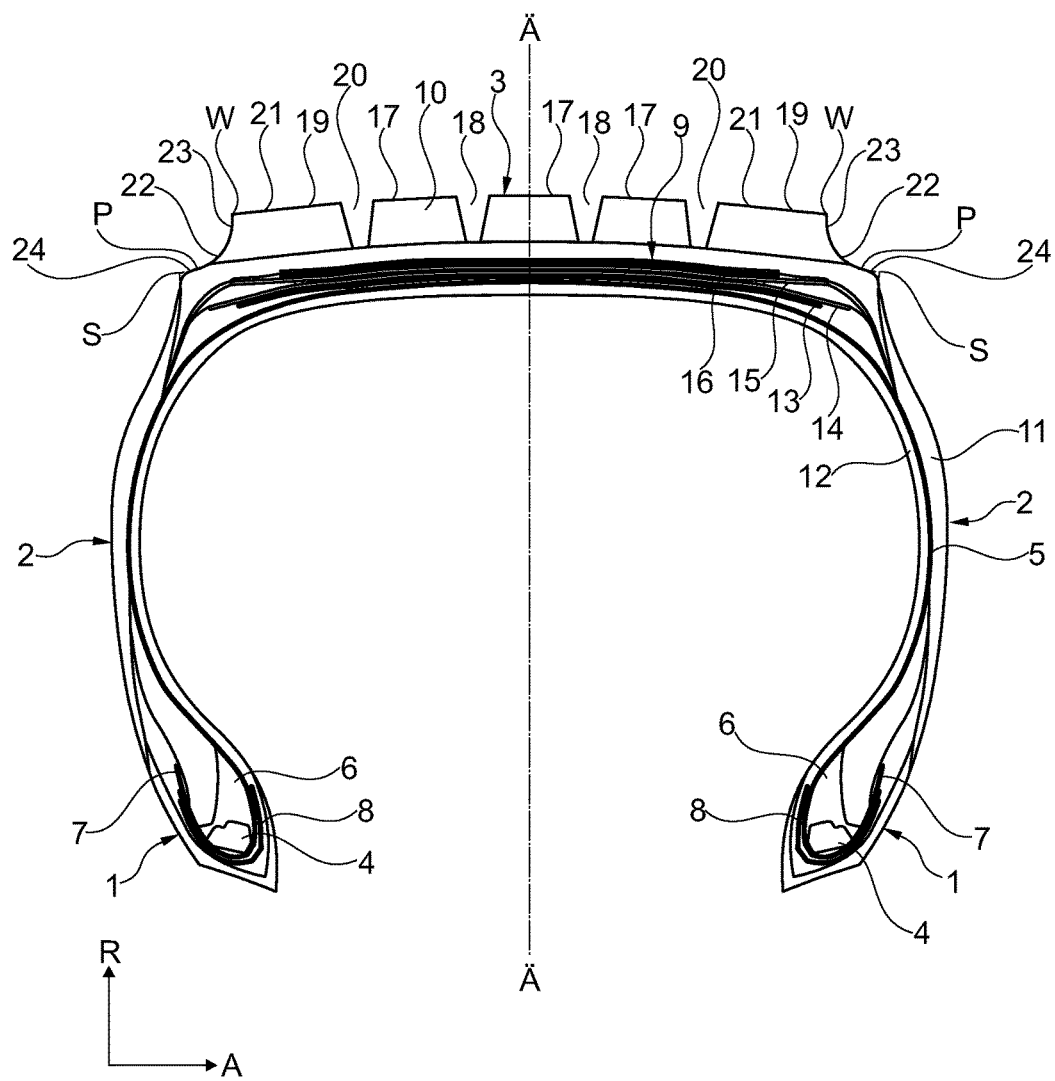

axial extension in a second extension section (22) of the width c, said extension section adjoining the first extension section (21) and extending to the surface of the tire lateral wall. The surface which forms the road contact surface is formed by a first sub-portion (23), which extends to a point P, and a second sub-portion (24), which extends from the point P to the surface of the tire lateral wall (2), in the second extension section (22) such that the surface which forms the road contact surface has a concave contour progression in the first sub-portion (23) and a convex contour progression in the second sub-portion (24) with a turning point of the contour progression in the point P, said point P being arranged outside of the belt (9) in the axial direction A.

20 Claims, 2 Drawing Sheets

(56) References Cited

U.S. PATENT DOCUMENTS

| | | | |
|---|---|---|---|
| 9,630,452 B2* | 4/2017 | Minowa | B60C 9/28 |
| 2012/0298279 A1* | 11/2012 | Tanno | B60C 9/18 |
| | | | 152/556 |
| 2013/0092308 A1* | 4/2013 | Zhu | B60C 13/02 |
| | | | 152/523 |
| 2014/0311648 A1 | 10/2014 | Yamada | |
| 2015/0336428 A1* | 11/2015 | Ito | B60C 11/03 |
| | | | 152/209.18 |
| 2016/0068022 A1 | 3/2016 | Hasegawa et al. | |

FOREIGN PATENT DOCUMENTS

| | | |
|---|---|---|
| JP | 3976373 B2 * | 9/2007 |
| WO | 2012/126671 A1 | 9/2012 |
| WO | 2013073153 A1 | 5/2013 |

* cited by examiner

VEHICLE TIRES

The invention relates to a pneumatic vehicle tire for utility vehicles having a belt and having a tread profile which extends in an axial direction A of the pneumatic vehicle tire between two tire shoulders, in which tire shoulders there is formed in each case one shoulder profile band which is formed so as to extend over the circumference of the pneumatic vehicle tire and which is delimited, in the axial direction A toward the equatorial plane Ä of the tire, by a channel extending over the circumference of the pneumatic vehicle tire and, on its side pointing away from the equatorial plane Ä, in each case by a surface of the tire side wall, which surface forms that flank of the shoulder profile band which points away from the equatorial plane Ä, wherein, in the section planes that encompass the tire axis, the tread profile is delimited by a surface which forms the road contact surface and which, between the shoulder profile bands, forms a surface contour line K which is curved toward the tire, wherein the surface which forms the road contact surface is, in at least one shoulder profile band, in an axial first extent section of the width a adjacent to the circumferential channel, formed as the elongation of the curved surface contour line K into the shoulder profile band and, in a second extent section of the width c adjoining the first extent section and extending as far as the surface of the tire side wall, declines continuously in terms of its radial position of the tire outwardly along the axial extent.

Pneumatic vehicle tire for utility vehicles having a tread profile which extends in an axial direction A of the pneumatic vehicle tire between two tire shoulders, in which tire shoulders there is formed in each case one shoulder profile band which is formed so as to extend over the circumference of the pneumatic vehicle tire and which is delimited, in the axial direction A toward the equatorial plane Ä of the tire, by a channel extending over the circumference of the pneumatic vehicle tire and, on its side pointing away from the equatorial plane Ä, in each case by a surface of the tire side wall, which surface forms that flank of the shoulder profile band which points away from the equatorial plane, wherein, in the section planes that encompass the tire axis, the tread profile is delimited by a surface which forms the road contact surface and which, between the shoulder profile bands, forms a surface contour line which is curved toward the tire.

Such pneumatic vehicle tires for utility vehicles are known. In the case of tires of this kind, in the cross-sectional planes that encompass the tire axis, the outer contour line in each case forms the intersection line contour of the shell surface formed by the radially outwardly directed surfaces that delimit the profile ribs or profile block elements of profile block rows. Normally, the outer contour line extends with a continuous slight curvature from the intersection line of one tire side wall of the tire with the radially outwardly directed surface of the shoulder band pointing toward said first tire side wall to the intersection line of the other tire side wall with the radially outwardly directed surface of the shoulder band pointing toward said second tire side wall.

It is known, in the case of pneumatic utility vehicle tires of this kind, to make it possible to realize a reduction in the rolling resistance by reducing the profile depth over the entire extent of the tread profile, but this comes at the expense of the wear characteristics of the pneumatic utility vehicle tire.

It is also known for only the shoulder profile band to be formed, over its entire width extent in the axial direction A of the tire, with a reduced profile depth in relation to the profile bands formed between the shoulder profile bands. A pronounced step of the surface contour and of the profile depth is formed as a result in the axial region of extent of the circumferential channel that separates the shoulder profile band from the adjacent profile bands. Such complete reductions of the profile depth in the region of the shoulder bands adversely affect both the wear characteristics and the rolling resistance.

From the German patent application DE 10 2009 044 418.1, it is known, in order to reduce the rolling resistance, for the surface contour of the shoulder band to be formed, in a first axial region of extent adjacent to the separating circumferential channel, so as to follow the surface contour line of the tread profile formed between the shoulder bands, as far as a step in the shoulder band at which the surface contour changes abruptly and, here, the profile depth is significantly reduced. From this step with the surface contour formed in a reduced radial position and with a reduced profile depth, the shoulder band is formed so as to extend as far as the side wall in a second axial region of extent of the shoulder band. This embodiment already leads to significant improvements in rolling resistance. Owing to the significant reduction in rubber material due to the removal of material, there is a slight increase in wear as a result. The abrupt change also permits the formation of cracks.

From WO 2012/126671 A, it is known, in order to reduce the rolling resistance and the wear in the case of a pneumatic vehicle tire of said type, for the surface contour in the shoulder band to be formed initially, in a first extent section which is adjacent to the separating circumferential channel, so as to follow the surface contour line as far as a bend. Then, in an axial second extent section from said bend to the side wall, the surface contour extends rectilinearly so as to be inclined inwardly in a radial direction, enclosing an angle of inclination with respect to the tangent to the surface contour line at the bend. This embodiment, with a type of bevel-like profile of the second extent section, already makes it possible to realize good rolling resistance characteristics with reduced crack formation. However, there is still a relatively large amount of rubber material present in the second extent section. In this embodiment, too, the potential for optimizing the rolling resistance is not yet fully utilized.

The invention is based on the object of providing a pneumatic vehicle tire for utility vehicles, as per the features of claim 1 of the preamble, in the case of which improved rolling resistance, with a further reduction of crack formation, is made possible using simple means.

The object is achieved according to the invention through the formation of a pneumatic vehicle tire for utility vehicles having a belt and having a tread profile which extends in an axial direction A of the pneumatic vehicle tire between two tire shoulders, in which tire shoulders there is formed in each case one shoulder profile band which is formed so as to extend over the circumference of the pneumatic vehicle tire and which is delimited, in the axial direction A toward the equatorial plane Ä of the tire, by a channel extending over the circumference of the pneumatic vehicle tire and, on its side pointing away from the equatorial plane Ä, in each case by a surface of the tire side wall, which surface forms that flank of the shoulder profile band which points away from the equatorial plane Ä, wherein, in the section planes that encompass the tire axis, the tread profile is delimited by a surface which forms the road contact surface and which, between the shoulder profile bands, forms a surface contour line K which is curved toward the tire, wherein the surface which forms the road contact surface is, in at least one shoulder profile band, in an axial first extent section of the width a adjacent to the circumferential channel, formed as the elongation of the curved surface contour line K into the shoulder profile band and, in a second extent section of the width c adjoining the first extent section and extending as far as the surface of the tire side wall, declines continuously in terms of its radial position of the tire outwardly along the axial extent, as per the features of claim 1, in which the surface which forms the road contact surface is, in the second extent section, formed with a first subsection, which extends as far as a point P, and from a second subsection, which extends from the point P to the surface of the tire side wall, and in which the surface which forms the road contact surface is formed with a concavely curved contour profile in the first subsection and with a convexly curved contour profile in the second subsection, with a turning point of the contour profile at the point P, wherein the point P is arranged outside the belt in the axial direction A.

By way of this embodiment, it is made possible for both the rolling resistance and the wear and thus the long-term performance of the tire to be improved. Here, the further improved material distribution in the shoulder outer region permits an optimization of the rolling resistance. The embodiment with the change, formed at the turning point outside the belt, from an initially concave contour profile to a then convex contour profile in the second extent section toward the tire side wall makes it possible here both to realize an improved material distribution—and thus a further improved rolling resistance—and to avoid discontinuous abrupt material changes—and thus crack formation. The embodiment with a concave contour profile formed in the first subsection makes it possible here to realize a smoothing of the contour profile changes, with a highly effective reduction in volume of rubber material. The adjoining convex form of the contour profile permits a further smoothing of the contour profile toward the shoulder, with a further reduction of material. The concave and adjoining convex form with the point P as a turning point thus permit considerable smoothing of the contour profile with a simultaneous material reduction, and hereby promote a further reduction in rolling resistance. The formation of said profile with a turning point axially outside the belt makes it possible to realize a considerable reduction in crack formation. The clear but smoothed material variation owing to the contour profile in the second extent section gives rise, during use under load, to a homogenized load distribution, optimized wear characteristics and, as a result, optimized long-term characteristics of the utility vehicle tire.

By way of this embodiment, it is made possible for both the rolling resistance and the wear and thus the long-term performance of the tire to be improved. The further improved material distribution in the shoulder outer region makes it possible here to realize an optimization of the rolling resistance the embodiment with the change, formed at the turning point outside the belt, from an initially concave contour profile and a convex contour profile toward the tire side wall in the second extent section The embodiment of a pneumatic vehicle tire as per the features of claim 2 is particularly advantageous, wherein the first subsection with concavely curved contour profile is formed so as to extend in the axial direction A of the tire from an axial position within the belt extent to the point P outside the belt. This permits greater material reduction and thus a further reduction of the rolling resistance.

The embodiment of a pneumatic vehicle tire as per the features of claim 3 is particularly advantageous, wherein, in the section planes that encompass the tire axis, the concavely curved contour profile is a contour profile curved with a curvature radius $R_a$ about a curvature central point $M_a$, wherein the curvature central point $M_a$ is arranged outside the contour line on that side of the contour line which points away from the tire. This permits a further smoothing of the material variation by way of a single curvature, and thus a further improvement for the avoidance of crack formation.

The embodiment of a pneumatic vehicle tire as per the features of claim 4 is particularly advantageous, wherein the curvature radius $R_a$ is configured such that 15 mm≤$R_a$≤100 mm. This makes it possible to realize an optimum compromise between minimization of rolling resistance and good resistance to crack formation.

The embodiment of a pneumatic vehicle tire as per the features of claim 5 is particularly advantageous, wherein the curvature radius $R_a$ is configured such that $P_T$≤$R_a$, where $P_T$ is the maximum profile depth of the tire. This permits a further optimization of the rolling resistance with a relatively small spacing of the point P to the tire axis, while maintaining good resistance to crack formation.

The embodiment of a pneumatic vehicle tire as per the features of claim 6 is particularly advantageous, wherein, in the section planes that encompass the tire axis, the convexly curved contour profile is a contour profile curved with a curvature radius $R_i$ about a curvature central point $M_i$, wherein the curvature central point $M_i$ is arranged outside the contour line on that side of the contour line which points toward the tire, where $R_i$ is configured such that $R_i$>$R_a$. This permits a further smoothing of the material variation and thus a further improvement for the avoidance of crack formation. Furthermore, it is possible here, in the contour profile, to realize a type of broad plateau with maximum material reduction, while utilizing the advantages of the smooth transition resulting from the radii, and to optimize the rolling resistance.

The embodiment of a pneumatic vehicle tire as per the features of claim 7 is particularly advantageous, wherein the curvature radius $R_i$ is configured such that 100 mm≤$R_i$≤2000 mm. In this way, it is possible in a simple manner, in the contour profile, to implement a type of broad plateau with a great material reduction and further reduced rolling resistance.

The embodiment of a pneumatic vehicle tire as per the features of claim 8 is particularly advantageous, wherein the width c is configured such that 5 mm≤c≤30 mm. In this way, it is possible in a simple manner to implement an adequately large width c for the optimization of the rolling resistance, and also a sufficiently small width c for improvements for avoidance of crack formation, while avoiding significant adverse effects on good handling characteristics.

The embodiment of a pneumatic vehicle tire as per the features of claim 9 is particularly advantageous, wherein the point P is arranged in the axial direction A with a spacing d, measured in the axial direction A, of 5 mm≤d≤10 mm to the belt. In this way, it is possible in a simple manner to promote a homogenization of the material distribution.

The embodiment of a pneumatic vehicle tire as per the features of claim 10 is particularly advantageous, wherein the point P is arranged at a radial position radially within the radial position of a point Q with a radial spacing e to the point Q, where 0 mm≤e≤2 mm, wherein the point Q forms the position of the intersection of the elongation of the profile depth contour line $K_P$ with the contour profile concavely curved in the first subsection. In this way, it is possible in a simple manner for the rubber thickness to be made sufficiently thick toward the belt edge for the purposes of high durability, and to nevertheless realize a significant material reduction.

The embodiment of a pneumatic vehicle tire as per the features of claim 11 is particularly advantageous, wherein the profile band is in the form of a profile rib. In conjunction with profile ribs, a maximum material reduction can be implemented. In this way, the effects of the contour profile can be utilized in an optimized manner.

The embodiment of a pneumatic vehicle tire as per the features of claim 12 is particularly advantageous, wherein the profile band is in the form of a profile block row.

The embodiment of a pneumatic vehicle tire as per the features of claim 13 is particularly advantageous, wherein the pneumatic vehicle tire is designed for use on the drive axle of a utility vehicle.

Figure 2:
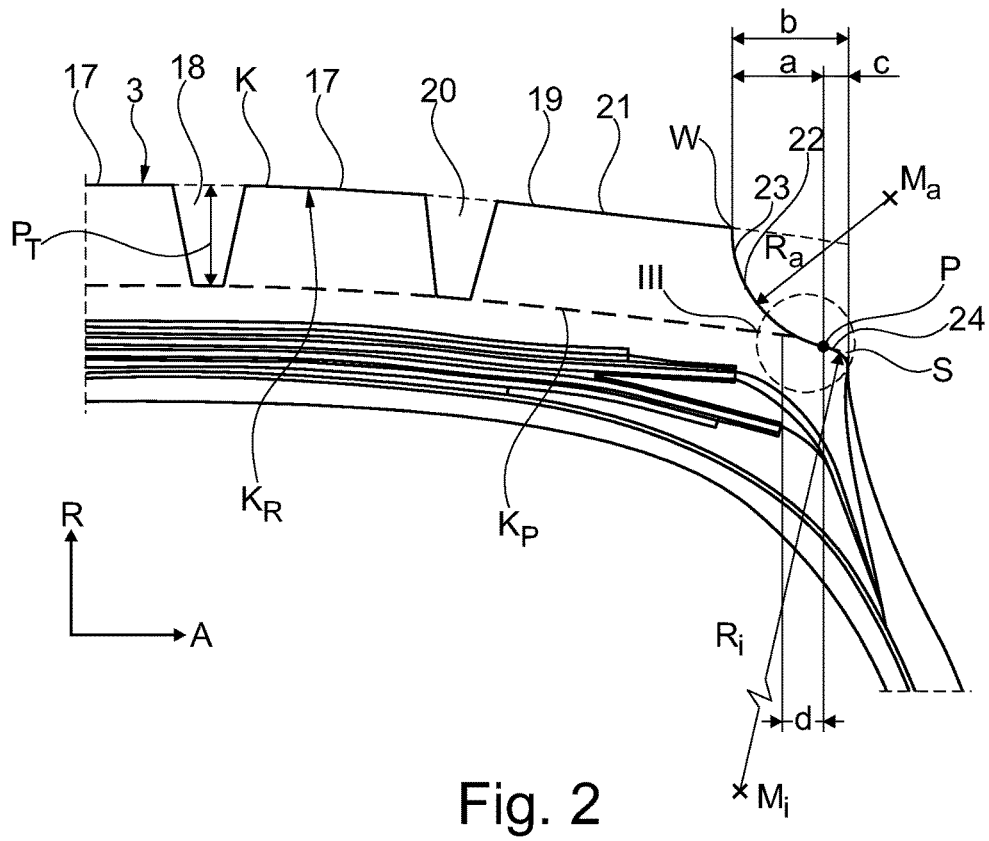
Figure 3:
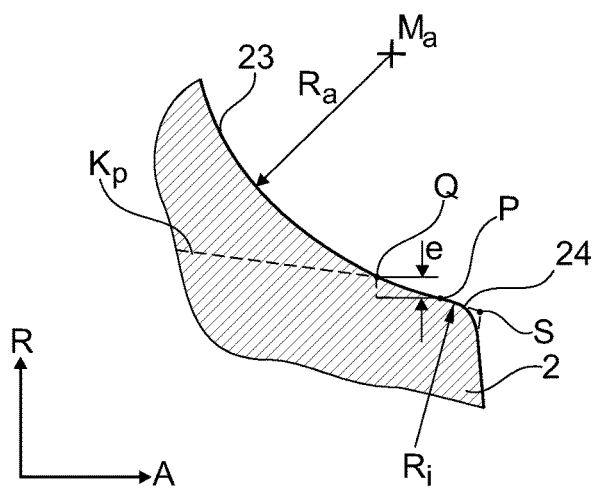

The invention will be discussed in more detail below on the basis of the exemplary embodiments illustrated in FIGS. 1 to 3, using the example of a pneumatic vehicle tire of radial type of construction for the drive axle of a utility vehicle. In the figures:

FIG. 1 shows a cross section, through the tire axis, of a pneumatic utility vehicle tire, FIG. 2 is an enlarged illustration of the shoulder section of the pneumatic utility vehicle tire of FIG. 1 in a cross-sectional illustration, and FIG. 3 is an enlarged illustration of the detail III from FIG. 2.

FIG. 1 and FIG. 2 show a pneumatic utility vehicle tire of radial type of construction for the drive axis of a utility vehicle, having two side walls 2 which extend in the radial direction R of the vehicle tire and having a crown region 3 which is formed axially between said side walls. The side walls are each formed with a bead region 1 on their extent end pointing inward in the radial direction, in which bead region there is formed a bead core 4 of known type, which has high tensile strength in the circumferential direction U and which extends over the circumference of the tire in the circumferential direction. The bead cores 4 are, in a known manner, formed in a wound manner from wire which extends in the circumferential direction U of the pneumatic vehicle tire and which is embedded in rubber. In the conventional manner, an apex (bead filler) 6 which is triangular in cross section is formed from a hard rubber material on the bead cores 4. The pneumatic vehicle tire is formed with a carcass 5 which, starting from the bead core 4 formed in the left-hand bead region 1 of the pneumatic vehicle tire, extends outward in the radial direction R of the pneumatic vehicle tire through the left-hand side wall 2 as far as the crown region 3 of the pneumatic vehicle tire, and in the crown region 3 extends in the axial direction A of the pneumatic vehicle tire to the right-hand side wall 2, and in the right-hand side wall 2 of the pneumatic vehicle tire extends radially inward as far as the bead core 4 formed in the bead region 1 of the right-hand side wall 2. The carcass is, in both core regions 1, formed so as to extend radially outward in each case along the axial inner side of the bead core 4 to the radial inner side of the respective bead core 4, then as an extension in the axial direction A along the radial inner side of the bead core 4 to the axial outer side of the bead core 4, and then as an extension on the axial outer side of the bead core 4, so as to constitute a turned-over part 7. The carcass 5 extends with its turned-over part 7 along the axial outer side of the apex 6 and ends on the axial outer side of the apex 6. The carcass 5 is formed, in a way which is known but not illustrated in more detail, from one or more carcass plies which extend(s) in the circumferential direction U over the entire circumference of the pneumatic vehicle tire and which has/have parallel cords—for example steel cords—which are each embedded in rubber and extend substantially in the radial direction R in the region of the side walls 2 and substantially in the axial direction A in the crown region 3. An inner layer 12 composed of known, particularly air-impermeable rubber material extends from the left-hand bead region 1 as far as the right-hand bead region 1 on that side of the carcass 5 which points toward the inside of the tire. An additional bead reinforcing strip 8, which extends over the entire circumference of the pneumatic vehicle tire, is respectively formed in the bead region 1 on that side of the carcass 5 which points away from the bead core 4. The bead reinforcing strip 8 is, for example, a material strip which is embedded in rubber and composed of parallel strength members of a textile or metallic design.

In the region of the tire crown 3, a belt 9, which extends over the entire circumference of the pneumatic vehicle tire in the circumferential direction U and in the axial direction A from the left-hand tire shoulder as far as the right-hand tire shoulder, is formed on the carcass 5, outside the carcass 5 in the radial direction R of the pneumatic vehicle tire, which belt 9 is formed with a known four-ply arrangement composed of four belt plies 13, 14, 15 and 16 which are arranged one above the other and so as to lie one on top of the other in the radial direction R. The belt plies 13, 14, 15 and 16 are in each case produced, in a known manner, from steel cords embedded in rubber, or from other known strength members that are suitable for the production of belt plies of utility vehicle tires. A profiled tread 10 of a known design, which extends over the entire circumference of the pneumatic vehicle tire in the circumferential direction U and in the axial direction A from the left-hand tire shoulder as far as the right-hand tire shoulder and which completely covers the belt 9, is formed on the belt 9 radially outside the belt 9. In the region of the tire side walls 2, a side wall rubber strip 11, which extends in the radial direction R from the bead region 1 as far as the profiled tread 10 in the crown region 3, is formed in a known manner on that side of the carcass 5 which points away axially from the tire.

The tread profile 3 is, in the two tire shoulders, formed from in each case one radially elevated profile band 19 which forms a shoulder band. The two profile bands 19 extend over the entire circumference of the pneumatic vehicle tire and are formed so as to be oriented in the circumferential direction U of the pneumatic vehicle tire. Toward the equatorial plane Ä of the pneumatic vehicle tire, the profile band 19 is delimited in each case by a circumferential channel 20 which extends over the entire circumference of the pneumatic vehicle tire and which is oriented in the circumferential direction U. Between the two circumferential channels 20, the tread profile 3 is formed from multiple profile bands 17 which are arranged adjacent to one another in the axial direction A of the pneumatic vehicle tire, which extend in each case over the entire circumference of the pneumatic vehicle tire and which are oriented in the circumferential direction. Adjacent profile bands 17 of said region of extent formed centrally between the circumferential channels 20 are in each case spaced apart from one another in the axial direction A of the pneumatic vehicle tire by a circumferential channel 18 which extends over the entire circumference of the pneumatic vehicle tire and which is oriented in the circumferential direction. In the illustrated exemplary embodiment of FIG. 1, three profile bands 17, which form the central region of extent, are formed between the two circumferential channels 20 which separate the respective shoulder region from the central extent section of the tread profile 3.

The circumferential channels 20 and 18 are limited in the radial direction toward the inside by a channel base and are formed with the maximum profile depth $P_T$. The circumferential channels are, by way of their channel base, tangent inwardly in the radial direction to the depth contour line $K_P$ which is formed in the cross-sectional planes that encompass the tire axis, which depth contour line forms the profile of the maximum profile depth of the tire. Here, the circumferential channel 20, in each case by way of its channel wall directed toward the adjacent profile band 19, forms that flank of the profile band 19 which delimits the profile band 19 in the direction of the equatorial plane Ä.

The axially outwardly pointing surface of that tire side wall 2 of the pneumatic vehicle tire which is illustrated on the left-hand side in FIG. 1 forms, in the elongation thereof, that flank of the profile band 19 formed in the left-hand tire shoulder which delimits said profile band 19 to the side pointing away from the equatorial plane Ä, and said axially outwardly pointing surface extends as far as the surface which delimits said profile band 19 outwardly in the radial direction R and which it intersects, in the cross-sectional planes that encompass the tire axis, at the intersection point S.

Likewise, the axially outwardly pointing surface of that tire side wall 2 which is illustrated on the right-hand side in FIG. 1 forms, in the radial elongation thereof, that flank of the profile band 19 formed in the right-hand tire shoulder which delimits said profile band 19 to the side pointing away from the equatorial plane Ä, and said axially outwardly pointing surface extends as far as the surface which delimits said profile band 19 outwardly in the radial direction R and which it intersects, as illustrated in FIG. 2, in the cross-sectional planes that encompass the tire axis, at the intersection point S.

The profile bands 17 of the central region of extent between the circumferential channels 20 are delimited, in a radial direction toward the outside, by way of their radially outer surface which forms the road contact surface and which, in the cross-sectional planes that encompass the tire axis, forms, in its elongation across the circumferential channels 18, as part of the shell surface of the tread profile, the surface contour line K between the circumferential channels 20. That surface of the profile bands 19 which points radially outward in the radial direction R of the tire is, in a first axial region of extent 21, in each case directly adjacent to the circumferential channel 20, of the extent width a measured in the axial direction A, in the cross-sectional planes that encompass the tire axis, formed in each case with its outer contour line as an elongation of the surface contour line K of the central extent section across the circumferential channel 20 as far as a point W formed with a spacing a, measured in the axial direction A, to the circumferential channel 20.

The surface contour line K is, between the point W of the right-hand tire shoulder and the point W of the left-hand tire shoulder, formed so as to be curved toward the tire interior so as to run continuously with a slight curvature with curvature radius $K_R$.

From the point W, the radially outer surface of the profile band 19 is, in a second axial region of extent 22 along the axial extent, formed so as to run with a continuous decline, in terms of radial position, as far as the intersection point S of the profile band 19. Said second region of extent 22 extends over an extent width c, measured in the axial direction A, between the point W and the intersection point S of the profile band 19.

Here, in the second axial region of extent 22, the radially outer surface of the profile band 19 is formed from a first extent subsection 23, which extends in the axial direction A from the point W to a point P on the radially outer surface contour, and from a second extent subsection 24, which extends in the axial direction A from the point P on the surface contour as far as the point S. Here, the radially outer surface of the profile band 19 is, in the first extent subsection 23, of curved form with a concavely curved curvature profile with curvature radius $R_a$ about a curvature central point $M_a$. As illustrated in FIG. 2, the curvature central point $M_a$ lies outside the tire on that side of the surface contour line of the profile band 19 which faces away from the tire in the second extent section 22. The point P forms a turning point in the curvature profile of the surface contour in the second extent section 22. In the second extent subsection 24, the surface contour is of curved form with a convexly curved curvature profile with curvature radius $R_i$ about a curvature central point $M_i$. Here, the curvature central point $M_i$ lies on that side of the contour line which faces from the surface contour line in the second extent section toward the tire. At the point P formed as a turning point, the concave curvature profile of the first extent subsection 23 transitions tangentially into the convex curvature profile of the second extent subsection 24.

The intersection point S is, in the illustrated exemplary embodiment, the intersection point between the elongated surface contour line of the side wall and the elongated contour profile of the second extent subsection 24 with convex curvature which is curved with curvature radius $R_i$ about the central point $M_i$.

In FIG. 2, for illustrative purposes, the transition, which is of rounded form for manufacturing reasons, between the second extent subsection 24 and surface contour of the side wall is illustrated as being provided with an exaggerated additional rounding.

As illustrated in FIG. 2, the point P is arranged at an axial position of the tire axially outside the belt 9 with a spacing d, measured in the axial direction A, to that belt edge which is closest in the axial direction A and which axially delimits the belt. As can be seen in FIGS. 1 and 2, the belt 9 of the pneumatic vehicle tire extends in the axial direction A of the pneumatic vehicle tire as far as into the axial region of extent of the width b of the radially outer surface of the respective profile band 19, and ends there with the spacing d to the point P.

As can be seen in FIG. 2 and in FIG. 3, the depth contour line $K_P$, which constitutes the maximum profile depth of the tire, intersects the radial surface contour of the shoulder band 21 within the first extent subsection 23 at a point Q. The point P is arranged at a position radially within the position of the point Q with a radial spacing e, measured in the radial direction R, to the point Q.

The curvature radii $R_a$ and $R_i$ are configured such that $R_i > R_a$.

Here, the curvature radius $R_a \geq P_T$, where $P_T$ is the maximum profile depth of the tire.

The curvature radius $R_i$ is configured such that 100 mm $\leq R_i \leq$ 2000 mm, and the curvature radius $R_a$ is configured such that 15 mm $\leq R_a \leq$ 100 mm.

The width c, measured in the axial direction A, of the second extent section 22 is configured such that 5 mm $\leq c \leq$ 30 mm.

The spacing d is configured such that 5 mm $\leq d \leq$ 10 mm.

The spacing e is configured such that 0 mm≤e≤2 mm, for example such that e=1 mm.

For example, $R_a$ is configured such that $R_a$=20 mm, $R_i$ is configured such that $R_i$=500 mm, c is configured such that c=20 mm and d is configured such that d=6 mm.

As can be seen in FIG. 2, the radially outer surface is in this case thus formed, by way of its surface contour line K in the region of extent 22 proceeding from point W axially outward as far as the intersection point S, with a contour profile in which the radial position of the surface contour line continuously declines, along its extent in the region of extent 22, from the point W to the point S of the profile band 19.

The extent width b is configured such that b=(a+c), where a >0 mm and c <b. The extent length b is configured such that 8 mm≤b≤70 mm. It has proven to be particularly advantageous for the extent length b to be configured such that 25 mm≤b≤60 mm. In the common tire sizes for utility vehicles, a configuration of b such that 40 mm≤b≤55 mm is particularly effective.

The profile bands 17 of the central region of extent are in the form of circumferential ribs of known type, or are in the form of circumferential profile block rows composed of profile block elements of known type which are arranged one behind the other over the circumference of the pneumatic vehicle tire and which are in each case separated from one another by transverse channels. Here, in one embodiment, all of the profile bands 17 are in the form of profile ribs. In another embodiment, all of the profile bands 17 are in the form of profile block rows. In a further embodiment, only some of the profile bands 17 are in the form of profile ribs, and the other profile bands 17 are in the form of profile block rows.

The shoulder profile bands 19 are, in one embodiment, in the form of circumferential ribs which extend over the entire circumference of the pneumatic vehicle tire. In another embodiment, the shoulder profile bands 19 are in the form of shoulder profile block rows with profile block elements of known type which are arranged one behind the other in the circumferential direction of the pneumatic vehicle tire and which are in each case spaced apart from one another by transverse channels. In another embodiment, one shoulder profile band 19 is in the form of a profile rib, and the other shoulder profile rib is in the form of a shoulder profile block row.

In one embodiment, the shoulder profile bands 19 are, on their surface directed outward in a radial direction R, provided at least partially with sipes of known type.

In another embodiment which is not illustrated, the belt 9 is formed with 3 or 5 belt plies.

The maximum profile depth $P_T$ measured in the radial direction R from the outer contour line K in the circumferential channel 20 is configured such that $P_T$>9 mm.

LIST OF REFERENCE SIGNS

Part of the Description

1 Bead region
2 Side wall
3 Crown region
4 Bead core
5 Carcass
6 Apex (bead filler)
7 Carcass turn-over
8 Bead reinforcing strip
9 Belt
10 Profiled tread
11 Side wall rubber strip
12 Inner layer
13 Belt ply
14 Belt ply
15 Belt ply
16 Belt ply
17 Profile band
18 Circumferential channel
19 Shoulder profile band
20 Circumferential channel
21 First extent region
22 Second extent region
23 First subsection
24 Second subsection

The invention claimed is:

1. A pneumatic vehicle tire defining an axis and having a circumference, the pneumatic vehicle tire comprising a belt and a tread profile which extends in an axial direction (A) of the pneumatic vehicle tire between two tire shoulders;
  wherein within each of the two tire shoulders there is formed one shoulder profile band which is formed so as to extend over the circumference and which is delimited, in the axial direction (A) toward the equatorial plane (Ä) of the pneumatic vehicle tire, by a channel extending over the circumference and, on its side pointing away from the equatorial plane (Ä), in each case by a surface of the tire side wall, and wherein the surface of the tire side wall forms a flank of the shoulder profile band which points away from the equatorial plane (Ä);
  wherein, in section planes that encompass the tire axis, the tread profile is delimited by a surface which forms a road contact surface and which, between the shoulder profile bands, forms a surface contour line (K) which is curved toward the tire, wherein the surface which forms the road contact surface is, in at least one shoulder profile band, in a first extent section of a width (a) adjacent to the channel, formed as an elongation of the curved surface contour line (K) into the at least one shoulder profile band and, in a second extent section of a width (c) adjoining the first extent section and extending as far as the surface of the tire side wall, declines continuously in terms of a radial position of the outermost portion of the tire along an axial extent;
  wherein in that the surface which forms the road contact surface is, in the second extent section, formed with a first subsection, which extends as far as a point (P), and a second subsection, which extends from the point (P) to the surface of the tire side wall;
  wherein the surface which forms the road contact surface is formed with a concavely curved contour profile in the first subsection and formed with a convexly curved contour profile in the second subsection, with a turning point of the contour profile at the point (P), wherein the point (P) is arranged outside the belt in the axial direction (A);
  wherein a sidewall area nearest the point (P) has a concavely curved contour profile; and,
  wherein the belt comprises at least one belt ply having opposing edges with curvatures opposite the surface contour line (K);
  wherein at least one circumferential channel is limited in a radial direction toward an inside by a channel base and is formed along a depth contour line with a maximum profile depth and the concavely curved contour profile in the first subsection intersects with the depth contour line, the channel base of each of the at least one circumferential channel are tangent inwardly in the radial direction to the depth contour line;

wherein the first subsection with concavely curved contour profile is formed so as to extend in the axial direction (A) of the tire from an axial position within an extent of the belt to the point P outside the belt; and wherein in the section planes that encompass the tire axis, the concavely curved contour profile of the road contact surface is a contour profile curved with a curvature radius (Ra) about a curvature central point (Ma), wherein the curvature central point (Ma) is arranged outside the tire.

2. The pneumatic vehicle tire according to claim 1, wherein the curvature radius (Ra) is configured such that 15 mm≤Ra≤100 mm.

3. The pneumatic vehicle tire according to claim 1, wherein the curvature radius (Ra) is configured such that PT≤Ra, where (PT) is the maximum profile depth of the tire.

4. The pneumatic vehicle tire according to claim 1, wherein in the section planes that encompass the tire axis, the convexly curved contour profile is a contour profile curved with a curvature radius (Ri) about a curvature central point Mi, wherein the curvature central point (Mi) is arranged outside the contour line on that side of the contour line which points toward the tire, and wherein the curvature radius (Ri) is configured such that Ri>Ra.

5. The pneumatic vehicle tire according to claim 4, wherein the curvature radius (Ri) is configured such that 100 mm≤Ri≤2000 mm.

6. The pneumatic vehicle tire according to claim 1, wherein the width (c) is configured such that 5 mm≤c≤30 mm.

7. The pneumatic vehicle tire according to claim 1, wherein the point (P) is arranged in the axial direction (A) with a spacing (d), measured in the axial direction (A), of 5 mm≤d≤10 mm to the belt.

8. The pneumatic vehicle tire according to claim 1, wherein the at least one shoulder profile band is in the form of a profile rib.

9. A pneumatic vehicle tire defining an axis and having a circumference, the pneumatic vehicle tire comprising a belt and a tread profile which extends in an axial direction (A) of the pneumatic vehicle tire between two tire shoulders;

wherein within each of the two tire shoulders there is formed one shoulder profile band which is formed so as to extend over the circumference and which is delimited, in the axial direction (A) toward the equatorial plane (Ä) of the pneumatic vehicle tire, by a channel extending over the circumference and, on its side pointing away from the equatorial plane (Ä), in each case by a surface of the tire side wall, and wherein the surface of the tire side wall forms a flank of the shoulder profile band which points away from the equatorial plane (Ä);

wherein, in section planes that encompass the tire axis, the tread profile is delimited by a surface which forms a road contact surface and which, between the shoulder profile bands of the two shoulders, forms a surface contour line (K) which is curved toward the tire, wherein the surface which forms the road contact surface is, in at least one shoulder profile band of the shoulder profile bands of the two shoulders, in a first extent section of a width (a) adjacent to the channel, formed as an elongation of the curved surface contour line (K) into the at least one shoulder profile band and, in a second extent section of a width (c) adjoining the first extent section and extending as far as the surface of the tire side wall, declines continuously in terms of a radial position of the outermost portion of the tire along an axial extent;

wherein in that the surface which forms the road contact surface is, in the second extent section, formed with a first subsection, which extends as far as a point (P), and a second subsection, which extends from the point (P) to the surface of the tire side wall;

wherein the surface which forms the road contact surface is formed with a concavely curved contour profile in the first subsection and formed with a convexly curved contour profile in the second subsection, with a turning point of the contour profile at the point (P), wherein the point (P) is arranged outside the belt in the axial direction (A);

wherein a plurality of central profile bands are located in a central region and is in the form of a profile block row, the central region being adjacent to the channel, the at least one shoulder profile band being wider in the axial direction than the at least one central profile band located in the central region and wherein a central channel exists between adjacent profile bands of the plurality of central profile bands, the central channel having a flat bottom and a central channel depth, where the central channel depth is at a maximum tread depth of the tire;

wherein a sidewall area nearest the point (P) has a concavely curved contour profile; and, wherein the belt comprises at least one belt ply having opposing edges with curvatures opposite the surface contour line (K).

10. The pneumatic vehicle tire according to claim 9, wherein the first subsection with concavely curved contour profile is formed so as to extend in the axial direction (A) of the tire from an axial position within an extent of the belt to the point (P) outside the belt.

11. The pneumatic vehicle tire according to claim 9, wherein in section planes that encompass the tire axis, the concavely curved contour profile of the road contact surface is a contour profile curved with a curvature radius (Ra) about a curvature central point (Ma), wherein the curvature central point (Ma) is arranged outside the tire.

12. The pneumatic vehicle tire according to claim 11, wherein the curvature radius (Ra) is configured such that 15 mm≤Ra≤100 mm.

13. The pneumatic vehicle tire according to claim 11, wherein the curvature radius (Ra) is configured such that the PT≤Ra, where (PT) is a maximum profile depth of the tire.

14. The pneumatic vehicle tire according to claim 11, wherein in the section planes that encompass the tire axis, the convexly curved contour profile is a contour profile curved with a curvature radius (Ri) about a curvature central point (Mi), wherein the curvature central point (Mi) is arranged outside the contour line on that side of the contour line which points toward the tire, and wherein the curvature radius (Ri) is configured such that Ri>Ra.

15. The pneumatic vehicle tire according to claim 14, wherein the curvature radius (Ri) is configured such that 100 mm≤Ri≤2000 mm.

16. The pneumatic vehicle tire according to claim 9, wherein the width (c) is configured such that 5 mm≤c≤30 mm.

17. The pneumatic vehicle tire according to claim 9, wherein the point (P) is arranged in the axial direction (A) with a spacing (d), measured in the axial direction (A), of 5 mm≤d≤10 mm to the belt.

18. A pneumatic vehicle tire comprising:

a left hand sidewall that extends in a radial direction R;

a right hand sidewall that extends in the radial direction R;

a tread profile formed axially between the left hand sidewall and the right hand sidewall;

the tread profile includes a shoulder profile band that extends over the entire circumference of the tire and oriented in the circumferential direction U and includes multiple profile bands arranged adjacent to one another and the shoulder profile band and separated from the shoulder profile band by a circumferential channel;

the tread profile having a surface contour K as a road contact surface, the surface contour K having a slight curvature $K_R$ from a point W of the left hand shoulder to a point W of the right hand shoulder;

the circumferential channel having a maximum depth profile $P_T$ of its base along a depth contour line $K_P$ that corresponds to the surface contour K between the point W of the left hand shoulder to the point W of the right hand shoulder;

the surface contour K from the point W of the right hand shoulder to a second point P of the right shoulder is concave with a radius $R_a$ about a center point $M_a$ and defines a first section;

the surface contour K from the second point P of the right shoulder to a third point S of the right shoulder is convex with a radius $R_i$ about a center point $M_i$ and defines a second section, where the radius $R_i$ is greater than the radius $R_a$ and the radius $R_a$ is greater than the maximum depth profile $P_T$ of the circumferential channel; and a fourth point Q of the surface contour K in the first section intersects with the depth contour line $K_P$.

19. The pneumatic vehicle tire according to claim 18, wherein the radius Ra is configured such that 15 mm≤Ra≤100 mm.

20. The pneumatic vehicle tire of claim 18, further comprising a belt that extends over the circumference of the tire, the belt comprises four belt plies and the tread profile is over the belt.

* * * * *